United States Patent
Chandran et al.

(10) Patent No.: US 10,942,321 B1
(45) Date of Patent: Mar. 9, 2021

(54) HYBRID WAVELENGTH-DIVISION MULTIPLEXING FILTERS

(71) Applicants: GLOBALFOUNDRIES U.S. Inc., Santa Clara, CA (US); KHALIFA UNIVERSITY OF SCIENCE AND TECHNOLOGY, Abu Dhabi (AE)

(72) Inventors: Sujith Chandran, Thiruvananthapuram (IN); Marcus Dahlem, S. M. Feira (PT); Ajey Poovannummoottil Jacob, Watervliet, NY (US); Yusheng Bian, Ballston Lake, NY (US); Bruna Paredes, Abu Dhabi (AE); Jaime Viegas, Abu Dhabi (AE)

(73) Assignees: GLOBALFOUNDRIES U.S. INC., Santa Clara, CA (US); KHALIFA UNIVERSITY OF SCIENCE AND TECHNOLOGY, Abu Dhabi (AE)

( * ) Notice: Subject to any disclaimer, the term of this patent is extended or adjusted under 35 U.S.C. 154(b) by 0 days.

(21) Appl. No.: 16/559,979

(22) Filed: Sep. 4, 2019

(51) Int. Cl.
  *G02B 6/42* (2006.01)
  *G02B 6/293* (2006.01)
(52) U.S. Cl.
  CPC ....... *G02B 6/4215* (2013.01); *G02B 6/29338* (2013.01)
(58) Field of Classification Search
  CPC .......................... G02B 6/4215; G02B 6/29338
  USPC ........................................................ 385/32
  See application file for complete search history.

(56) References Cited

U.S. PATENT DOCUMENTS

| 7,356,221 | B2 | 4/2008 | Chu et al. | |
| 2006/0078254 | A1* | 4/2006 | Djordjev | G02B 6/12007 385/32 |
| 2008/0166095 | A1* | 7/2008 | Popovic | G02B 6/12007 385/126 |
| 2009/0010386 | A1 | 1/2009 | Peschmann | |
| 2013/0272652 | A1* | 10/2013 | Yaacobi | G02B 6/1226 385/27 |

OTHER PUBLICATIONS

Folkert Horst, William M.J. Green, Solomon Assefa, Steven M. Shank, Yurii A. Vlasov, and Bert Jan Offrein, "Cascaded Mach-Zehnder wavelength filters in silicon photonics for low loss and flat pass-band WDM (de-) multiplexing," Opt. Express 21, 11652-11658 (2013).

(Continued)

*Primary Examiner* — Jerry M Blevins
(74) *Attorney, Agent, or Firm* — Thompson Hine LLP; Anthony Canale

(57) ABSTRACT

Structures for a wavelength-division multiplexing filter and methods of fabricating a structure for a wavelength-division multiplexing filter. The structure includes a first waveguide core, a second waveguide core laterally spaced from the first waveguide core, and a ring resonator arranged in a vertical direction over the first waveguide core and the second waveguide core. The ring resonator is also arranged in a lateral direction between the first waveguide core and the second waveguide core. The first and second waveguide cores are composed of a semiconductor material, such as single-crystal silicon, and the ring resonator is composed of a dielectric material, such as silicon nitride.

20 Claims, 5 Drawing Sheets

(56) References Cited

OTHER PUBLICATIONS

T. A. Huffman, G. M. Brodnik, C. Pinho, S. Gundavarapu, D. Baney and D. J. Blumenthal, "Integrated Resonators in an Ultralow Loss Si3N4/SiO2Plafform for Multifunction Applications," in IEEE Journal of Selected Topics in Quantum Electronics, vol. 24, No. 4, pp. 1-9, Jul.-Aug. 2018, Art.

Yue-De Yang, Yu Li, Yong-Zhen Huang, and Andrew W. Poon, "Silicon nitride three-mode division multiplexing and wavelength-division multiplexing using asymmetrical directional couplers and microring resonators," Opt. Express 22, 22172-22183 (2014).

J. R. Ong, R. Kumar and S. Mookherjea, "Ultra-High-Contrast and Tunable-Bandwidth Filter Using Cascaded High-Order Silicon Microring Filters," in IEEE Photonics Technology Letters, vol. 25, No. 16, pp. 1543-1546, Aug. 15, 2013.

\* cited by examiner

US 10,942,321 B1

HYBRID WAVELENGTH-DIVISION MULTIPLEXING FILTERS

BACKGROUND

The present invention relates to photonics chips and, more specifically, to structures for a wavelength-division multiplexing filter and methods of fabricating a structure for a wavelength-division multiplexing filter.

Photonics chips are used in many applications and systems including, but not limited to, data communication systems and data computation systems. A photonics chip integrates multiple optical components, such as waveguides and optical switches, and multiple electronic components, such as field-effect transistors, into a unified platform. Among other factors, layout area, cost, and operational overhead may be reduced by the integration of both types of components on the same chip.

Wavelength-division multiplexing is a technology that multiplexes multiple data streams onto a single optical link. In a wavelength-division multiplexing scheme, a set of data streams is encoded onto optical carrier signals with a different wavelength of laser light for each data stream. These optical carrier signals of the individual data streams are then combined in an optical wavelength-division multiplexing filter, which has a dedicated input for the data stream of each wavelength and a single output at which the individual data streams are combined (i.e., multiplexed) into a single multi-wavelength data stream for further transport through a single optical link. At the receiver side of the optical data link, a wavelength-division multiplexing filter of the same type, but used in reverse, separates (i.e., de-multiplexes) the optical carrier signals of the individual data streams and the separated optical carrier signals are directed to corresponding optical detectors.

Wavelength-division multiplexing filters fabricated from silicon are extremely sensitive to temperature drift due to the relatively high thermal optical coefficient of silicon. Silicon-based wavelength-division multiplexing filters may rely on resistive heaters in an attempt to control the temperature shift. However, the addition of resistive heaters adds complexity to not only device fabrication, but also to device operation due to the need to control the operation of the resistive heaters. In addition, the resistive heaters require the dissipation of high amounts of power to provide the requisite heating for temperature shift control.

Improved structures for a wavelength-division multiplexing filter and methods of fabricating a structure for a wavelength-division multiplexing filter are needed.

SUMMARY

In an embodiment of the invention, a structure for a wavelength-division multiplexing filter is provided. The structure includes a first waveguide core, a second waveguide core, and a ring resonator arranged in a vertical direction over the first waveguide core and the second waveguide core and in a lateral direction between the first waveguide core and the second waveguide core. The first waveguide core and the second waveguide core are composed of a semiconductor material, and the ring resonator is composed of a dielectric material, such as silicon nitride.

In an embodiment of the invention, a method of forming a wavelength-division multiplexing filter is provided. The method includes patterning a semiconductor layer to form a first waveguide core and a second waveguide core, depositing a dielectric layer over the first waveguide core and the second waveguide core, and patterning the dielectric layer to form a ring resonator arranged in a lateral direction between the first waveguide core and the second waveguide core. The first waveguide core and the second waveguide core are composed of a semiconductor material, and the ring resonator is composed of a dielectric material, such as silicon nitride.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
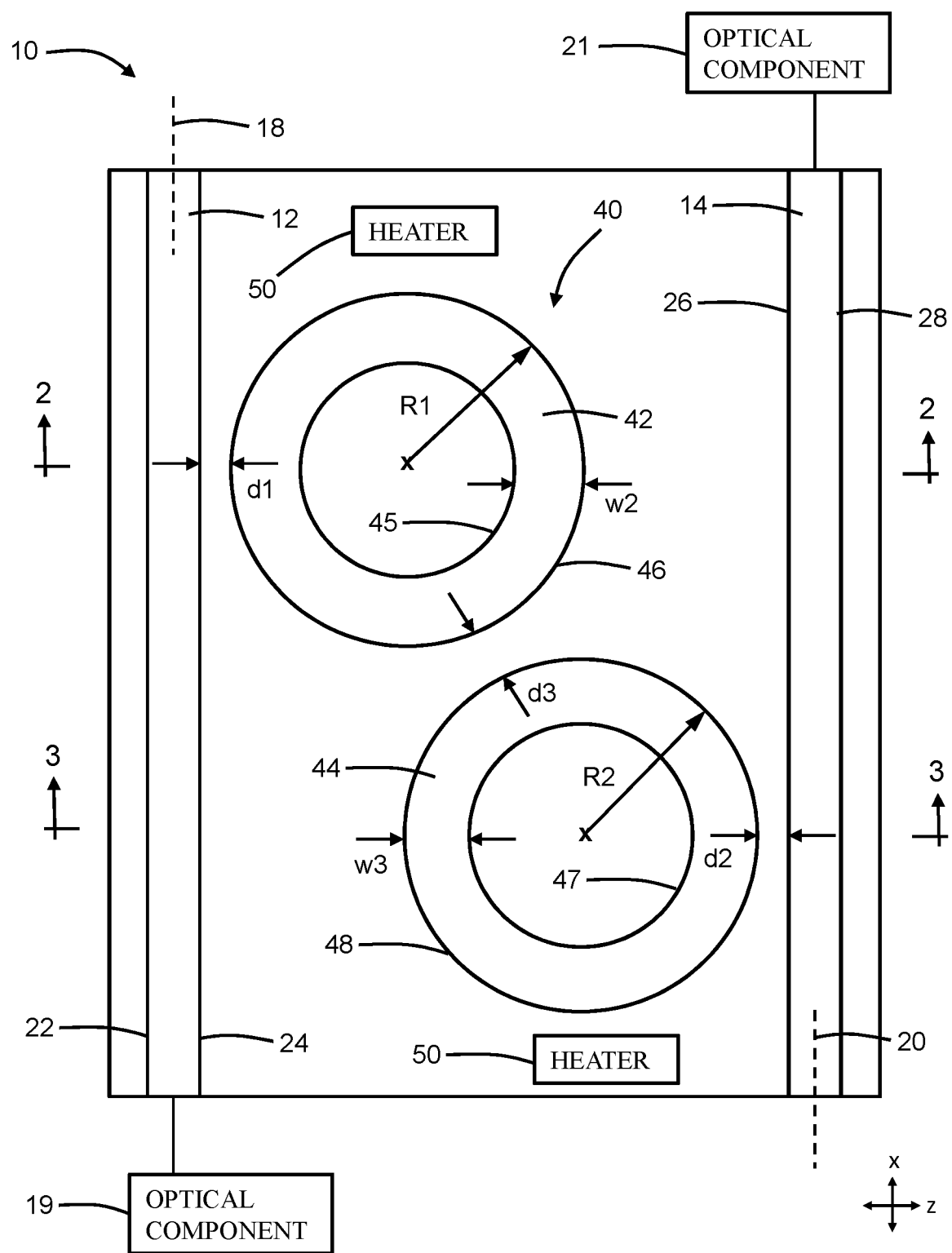
FIG. 1 is a simplified diagrammatic top view of a structure at an initial fabrication stage of a processing method in accordance with embodiments of the invention.
Figure 2:
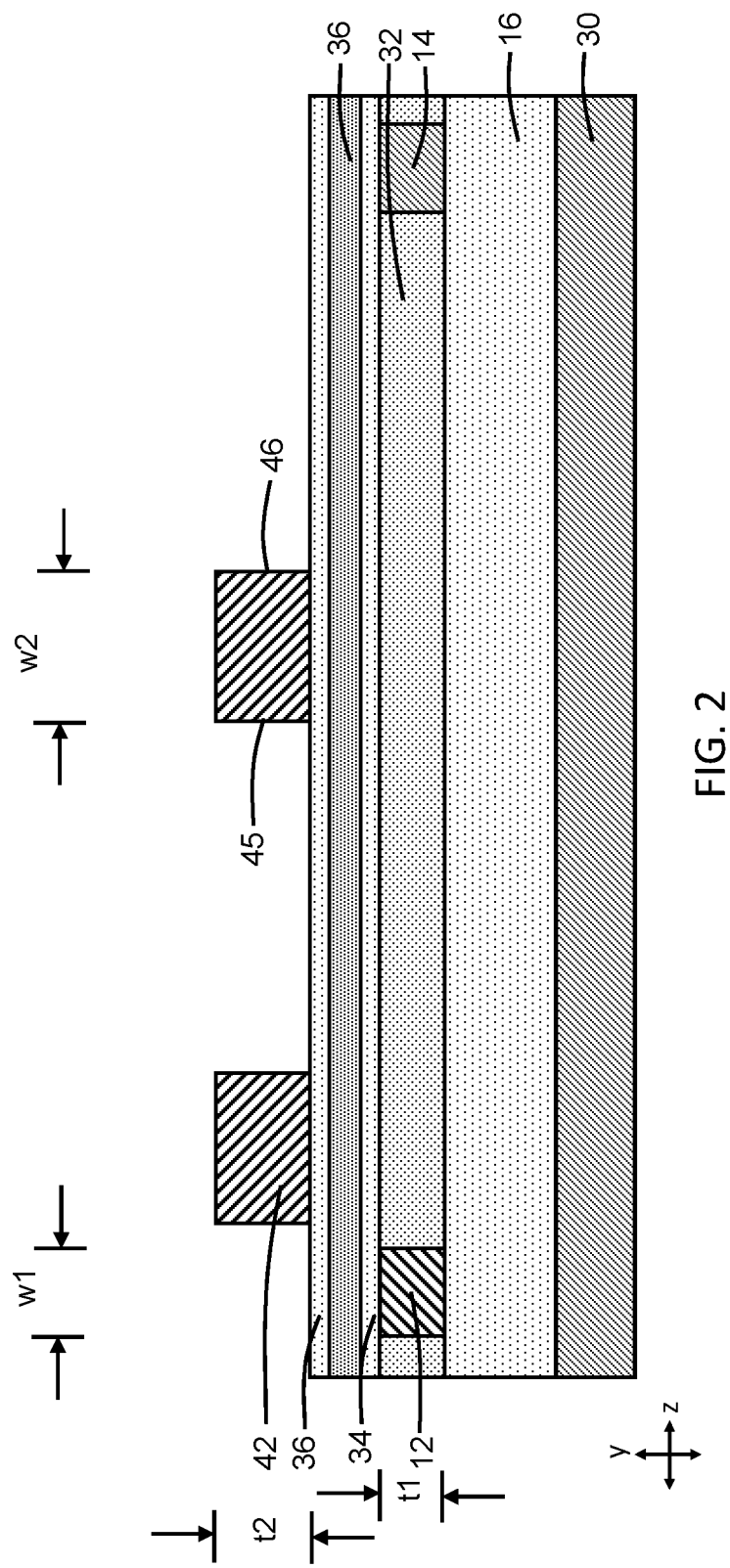
FIG. 2 is a cross-sectional view taken generally along line 2-2 in FIG. 1.
Figure 3:
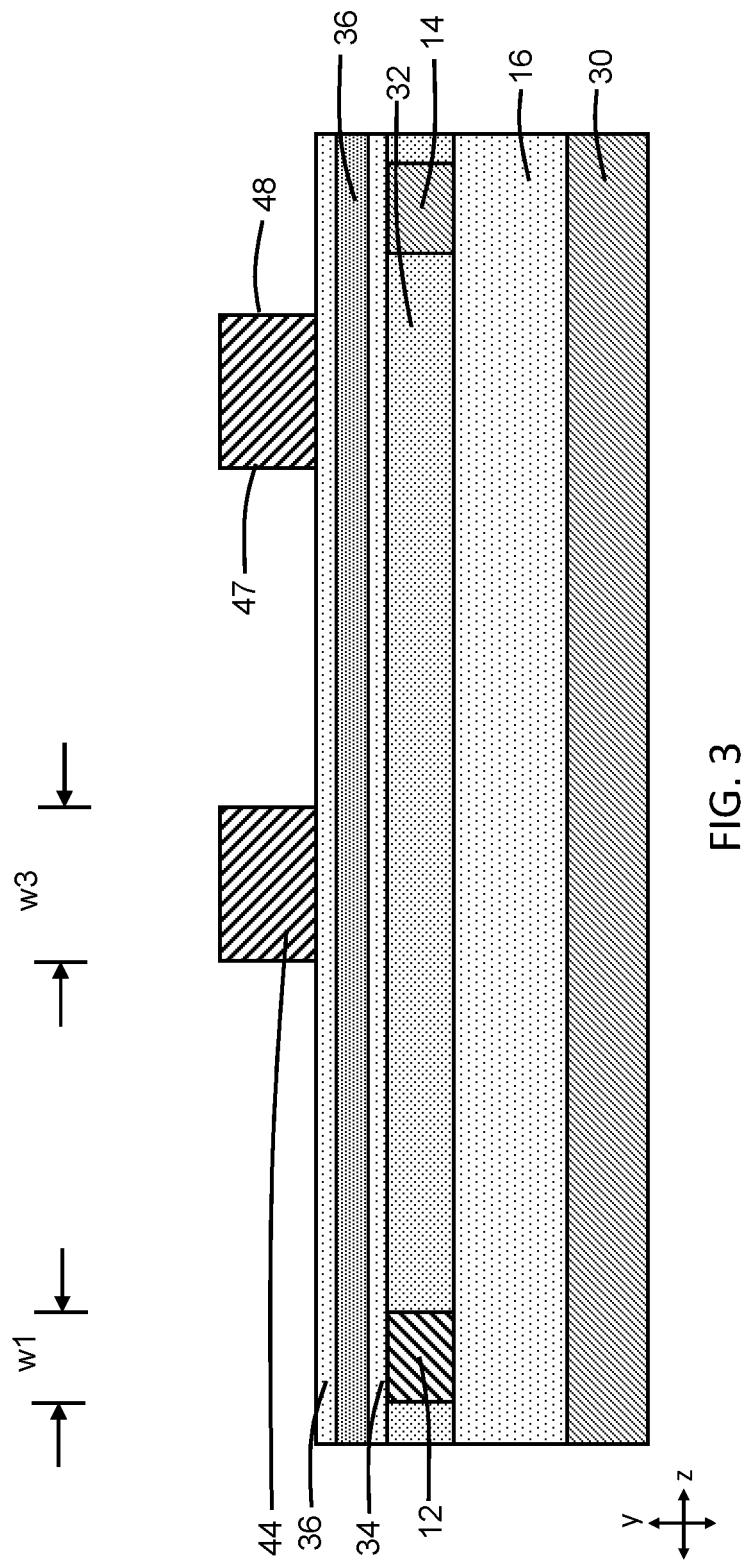
FIG. 3 is a cross-sectional view taken generally along line 3-3 in FIG. 1.

With reference to FIGS. 1, 2, 3 and in accordance with embodiments of the invention, a structure 10 for a wavelength-division multiplexing filter includes a waveguide core 12 and a waveguide core 14 arranged over a dielectric layer 16. The waveguide core 12 extends in a strip along a longitudinal axis 18 over the portion of the waveguide core 12 involved in the structure 10 and provides a bus waveguide along which multiplexed data streams encoded into optical signals of different wavelength may propagate. The waveguide core 12 may provide an input port to the structure 10, and may be coupled with one or more optical components 19, such as one or more lasers generating the optical signals at the different wavelengths. The waveguide core 14 extends over a finite portion of its length along a longitudinal axis 20, and the waveguide core 14 may provide a local waveguide section coupled with an optical component 21, such as a photodetector. The portion of the waveguide core 14 may provide an output port from the structure 10. The waveguide core 14 has a length and a shape that are sufficient to be connected with the optical component 21. The longitudinal axis 18 may be aligned substantially parallel to the longitudinal axis 20.

The waveguide core 12 includes sidewalls in the form of side surfaces 22, 24 that project in a vertical direction from the dielectric layer 16. The side surfaces 22, 24 may be substantially linear or straight over the section of the waveguide core 12 involved in the structure 10 such that the section of the waveguide core 12 is substantially linear or straight. The side surfaces 22, 24 may be vertical, as shown, or may be angled inwardly such that the waveguide core 12 has a trapezoidal cross-sectional profile. Similarly, the waveguide core 14 includes sidewalls in the form of side surfaces 26, 28 that project in a vertical direction from the dielectric layer 16. The side surfaces 26, 28 may be substantially linear or straight over the section of the waveguide core 14 involved in the structure 10 such that the section of the waveguide core 14 is substantially linear or straight. The side surfaces 26, 28 may be vertical, as shown, or may be angled inwardly such that the waveguide core 14 has a trapezoidal cross-sectional profile. The waveguide cores 12, 14 each have a width, w1.

The waveguide cores 12, 14 may be composed of a single-crystal semiconductor material, such as single-crystal silicon and, in particular, single-crystal silicon originating from a device layer of a silicon-on-insulator (SOI) wafer. The silicon-on-insulator wafer further includes a buried insulator layer composed of a dielectric material, such as silicon dioxide, that provides the dielectric layer 16 and a substrate 30 composed of a single-crystal semiconductor material, such as single-crystal silicon, under the buried insulator layer. The waveguide cores 12, 14 may be patterned from a layer of single-crystal semiconductor material (e.g., the device layer of the SOI wafer) by lithography and etching processes, and may have equal thicknesses, t1, to provide coplanarity.

Dielectric layers 32, 34, 36, 38 composed of respective dielectric materials are sequentially formed in a layer stack over the waveguide cores 12, 14. In the layer stack, the dielectric layer 32 is arranged over the dielectric layer 16, the dielectric layer 34 is arranged over the dielectric layer 32, the dielectric layer 36 is arranged over the dielectric layer 34, and the dielectric layer 38 is arranged over the dielectric layer 36. The waveguide cores 12, 14 are embedded or buried in the dielectric material of the dielectric layer 32, which acts as lateral cladding. In particular, the dielectric material of the dielectric layer 32 is located in the space between the embedded waveguide cores 12, 14.

The dielectric layer 32 may be composed of a dielectric material, such as silicon dioxide, deposited by chemical vapor deposition and planarized with, for example, chemical mechanical polishing to remove topography. The dielectric layer 34 may be composed of dielectric material, such as silicon dioxide, deposited by chemical vapor deposition or atomic layer deposition over the dielectric layer 32. The dielectric layer 36 may be composed of dielectric material, such as silicon nitride, deposited by chemical vapor deposition or atomic layer deposition over the dielectric layer 34. The dielectric layer 38 may be composed of dielectric material, such as silicon dioxide, deposited by chemical vapor deposition or atomic layer deposition over the dielectric layer 36. The dielectric layers 34, 36, 38 may be planar layers arranged in the layer stack over the planarized top surface of the dielectric layer 32. In the top view of FIG. 1, the dielectric layers 32, 34, 36, 38 are omitted for clarity of depiction.

A ring resonator 40 is formed over the dielectric layer 38 in a space laterally between the underlying waveguide core 12 and waveguide core 14, and vertically over the dielectric layer 38. The ring resonator 40 may include a waveguide ring 42 and a waveguide ring 44 that are arranged in a spaced arrangement between the waveguide cores 12, 14. In an embodiment, the ring resonator 40 may be a second-order filter that includes only two waveguide rings 42, 44. In an embodiment, the waveguide rings 42, 44 may be serially coupled. In alternative embodiments, the ring resonator 40 may include additional waveguide rings. The waveguide rings 42, 44 may be composed of a dielectric material, such as silicon nitride. The waveguide rings 42, 44 may be patterned from a layer of the constituent dielectric material by lithography and etching processes during front-end-of-line processing, and may have equal thicknesses, t2, to provide coplanarity.

The waveguide ring 42 has an inner sidewall or side surface 45 and an outer sidewall or side surface 46 at a given outer radius, r1, from its center. The side surfaces 45, 46 may be vertical, as shown, or may be angled inwardly such that the waveguide ring 42 has a trapezoidal cross-sectional profile. The waveguide ring 44 has an inner sidewall or side surface 47 and an outer sidewall or side surface 48 at a given outer radius, r2, from its center. The side surfaces 47, 48 may be vertical, as shown, or may be angled inwardly such that the waveguide ring 44 has a trapezoidal cross-sectional profile. In an embodiment, the outer radii of the waveguide rings 42, 44 may be equal or substantially equal, and may be increased or decreased as a factor to assist in selecting the resonance wavelengths.

The waveguide rings 42, 44 are arranged in a different level of the structure 10 than the level containing the waveguide cores 12, 14. The waveguide rings 42, 44 are arranged as coplanar features in an upper level of the structure 10, and the waveguide cores 12, 14 are arranged as coplanar features in a lower level of the structure 10. The waveguide ring 42 defines a closed loop in which the waveguide ring 42 is spaced from the waveguide core 12 at their closest separation by a perpendicular distance, d1. The perpendicular distance, d1, is less than a minimum distance needed to permit optical signal transfer between the waveguide core 12 and the waveguide ring 42. The waveguide ring 44 defines a closed loop in which the waveguide ring 44 is spaced from the waveguide core 14 at their closest separation by a perpendicular distance, d2. The perpendicular distance, d2, is less than a minimum distance needed to permit optical signal transfer between the waveguide core 14 and the waveguide ring 44. The waveguide ring 42 is arranged adjacent to the waveguide ring 44, and the waveguide ring 42 is laterally offset or spaced from the waveguide ring 44 by a perpendicular distance, d3, at their closest separation between their respective side surfaces 44, 46. The perpendicular distance, d3, is less than a minimum distance needed to permit optical signal transfer between the waveguide ring 42 and the waveguide ring 44. The respective perpendicular distances are distances from one object to the other, measured along a line that is perpendicular to one or both objects. The perpendicular distances d1 and d2 are not measured in the plane of the waveguide rings 42, 44 or in the plane of the waveguide cores 12, 14, but are instead measured between these different planes. The perpendicular distance d3 is measured in the plane of the waveguide rings 42, 44.

The multiple-level arrangement of the waveguide rings 42, 44 relative to the waveguide cores 12, 14 permits flexible placement of the waveguide core 12 relative to the waveguide ring 42 and the waveguide core 14 relative to the waveguide ring 44. In the representative embodiment, the waveguide core 12 and the waveguide ring 42 are arranged with a non-overlapping relationship, and the waveguide core 14 and the waveguide ring 44 are also arranged with a non-overlapping relationship. In an alternative embodiment, the waveguide core 12 and the waveguide ring 42 may be arranged with an overlapping relationship, and the waveguide core 14 and the waveguide ring 44 may also be arranged with an overlapping relationship. In an alternative embodiment, the side surface 24 of the waveguide core 12 may be arranged directly under the side surface 46 of waveguide ring 42, and the side surface 26 of the waveguide core 14 may also be arranged directly under the side surface 48 of waveguide ring 44.

In an embodiment, the waveguide ring 42 may have a width, w2, and the waveguide ring 44 may have a width, w3, that are each greater than the widths, w1, of the waveguide cores 12, 14. In an embodiment, the width, w2, of the waveguide ring 42 may be substantially equal to the width, w3, of the waveguide ring 44 such that their inner and outer radii are both substantially equal. In an embodiment, waveguide rings 42, 44 may have a thickness, t2, that is greater than the thickness, t1, of the waveguide cores 12, 14. The widths and thickness of the waveguide rings 42, 44 may be selected to match the effective refractive index of the waveguide rings 42, 44 to the effective refractive index of the waveguide cores 12, 14.

In use, the waveguide core 12 may guide a set of data streams encoded onto optical carrier signals with a different wavelength of laser light for each data stream as input to the ring resonator 40. The particular optical carrier signals in the set having a wavelength that meets the resonance condition of the waveguide ring 42 will couple into the waveguide ring 42 and, after transfer, circulate within the waveguide ring 42. The wavelength of the particular optical carrier signals may also meet the resonance condition of the waveguide ring 42 and couple into the waveguide ring 44 or, alternatively, the loops around the waveguide ring 42 may bring the wavelength of the particular optical carrier signals to the resonance condition of the waveguide ring 44. After transfer, the particular optical carrier signals circulate within the waveguide ring 44. The wavelength of the particular optical carrier signals may also meet the resonance condition of the waveguide ring 44 and couple into the waveguide core 14 or, alternatively, the loops around the waveguide ring 44 may bring the wavelength of the particular optical carrier signals to the resonance condition of the waveguide ring 44 for coupling into the waveguide core 14.

Figure 4:
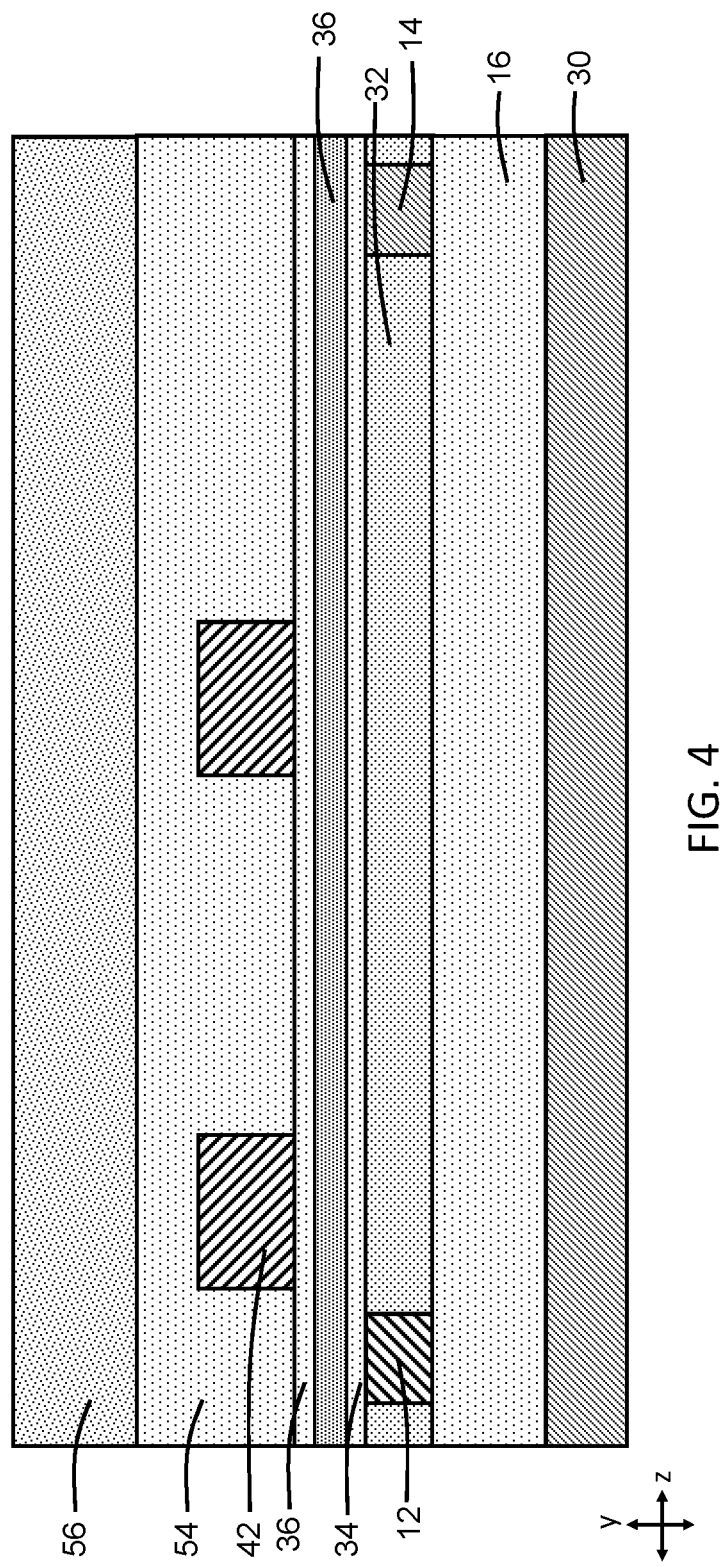
FIGS. 4 and 5 are cross-sectional views of the structure at successive fabrication stages of the processing method respectively subsequent to FIGS. 2 and 3.
Figure 5:
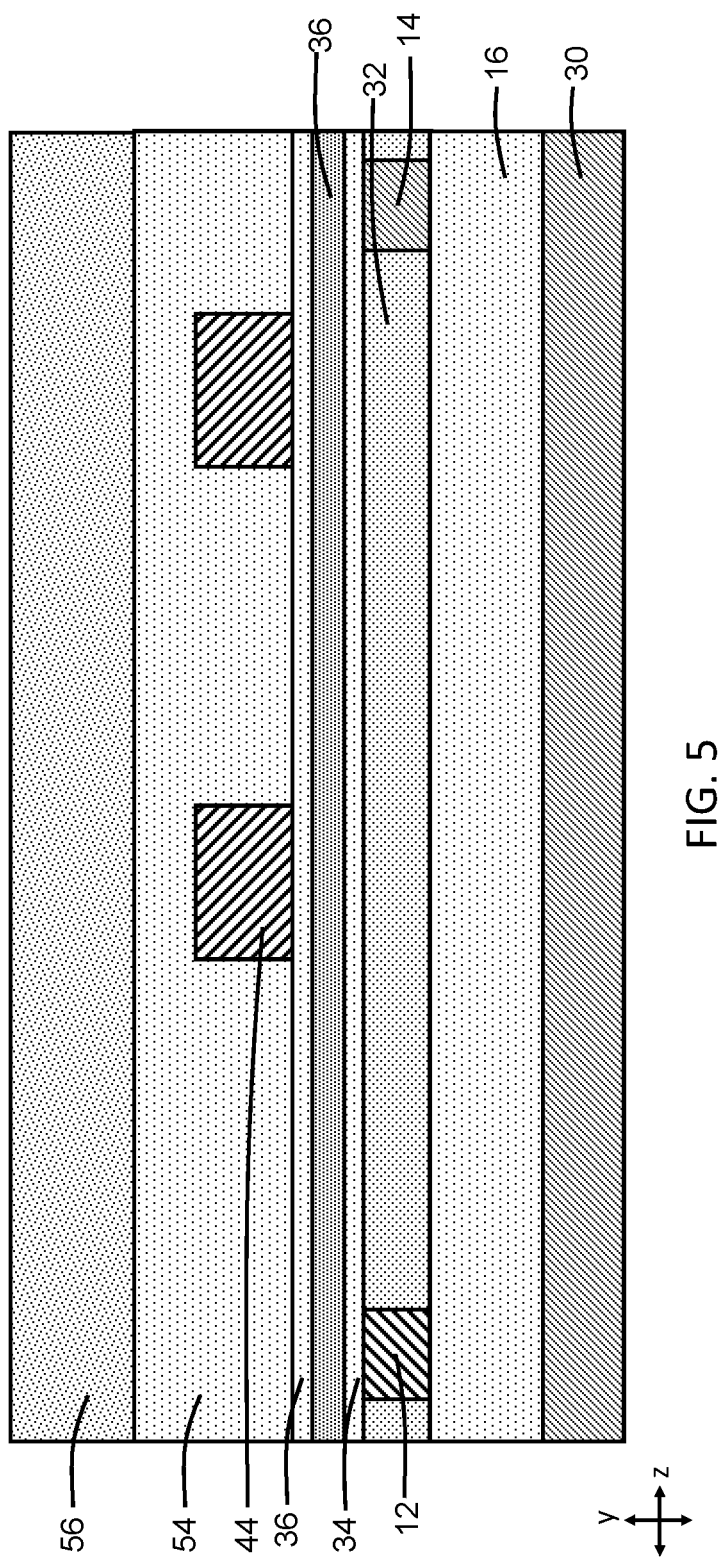

With reference to FIGS. 4, 5 in which like reference numerals refer to like features in FIGS. 2, 3 and at a subsequent fabrication stage, a dielectric layer 54 of a contact level is formed by middle-of-line processing over the dielectric layer 38. The dielectric layer 54 may be composed of dielectric material, such as silicon dioxide, deposited by chemical vapor deposition using ozone and tetraethylorthosilicate (TEOS) as reactants.

A back-end-of-line stack, generally indicated by reference numeral 56, is formed by back-end-of-line processing over the dielectric layer 54 and the structure 10. The back-end-of-line stack 56 may include one or more interlayer dielectric layers composed of one or more dielectric materials, such as a carbon-doped silicon oxide, and metallization composed of, for example, copper, tungsten, and/or cobalt that is arranged in the one or more interlayer dielectric layers.

The structure 10 may have an entirely passive construction that lacks heaters. In an alternative embodiment, one or more resistive heaters 50 may be fabricated in the dielectric layer 54 or in the back-end-of-line stack 56, and may be operated to provide thermal tuning to compensate for fabrication imperfections. The one or more resistive heaters 50 may also be fabricated as silicide heaters using the same semiconductor layer as used to fabricate the waveguide cores 12, 14. The one or more resistive heaters 50 are connected with a control circuit that outputs regulated power supplied to the one or more resistive heaters 50.

The structure 10, in any of the embodiments described herein, may be integrated into a photonics chip that includes electronic components and additional optical components formed on the same chip. For example, the electronic components may include field-effect transistors that are fabricated by CMOS front-end-of-line (FEOL) processing.

The structure 10 provides a composite or hybrid wavelength-division multiplexing filter based on bus waveguides composed of a semiconductor material (e.g., single-crystal silicon) and a ring resonator composed of a dielectric material (e.g., silicon nitride). The material of the bus waveguides enables compact routing, and the material of the ring resonator provides for a low thermal dependence. The structure 10 may overcome the minimum feature design rule limitation for optimal design filter bandwidth. Multiple replicas of the ring resonator 40, each with a waveguide ring 42 tuned with a different resonance wavelength, may be used to transfer multiplexed data streams encoded into optical carrier signals of different wavelength may propagate The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or "in direct contact with" another feature if intervening features are absent. A feature may be "indirectly on" or "in indirect contact with" another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a wavelength-division multiplexing filter, the structure comprising:
    a first waveguide core;
    a second waveguide core laterally spaced from the first waveguide core; and
    a ring resonator over the first waveguide core and the second waveguide core, the ring resonator including a first waveguide ring and a second waveguide ring laterally between the first waveguide core and the second waveguide core, the first waveguide ring having a first non-overlapping relationship with the first waveguide core, and the second waveguide ring having a second non-overlapping relationship with the second waveguide core,
    wherein the first waveguide core and the second waveguide core comprise a semiconductor material, and the first waveguide ring and the second waveguide ring of the ring resonator comprise a dielectric material.

2. The structure of claim 1 wherein the first waveguide ring is spaced from the second waveguide ring by a perpendicular distance that is less than a minimum distance for optical signal transfer between the first waveguide ring and the second waveguide ring.

3. The structure of claim 1 wherein the first waveguide core is spaced from the first waveguide ring by a first perpendicular distance that is less than a minimum distance for optical signal transfer between the first waveguide core and the first waveguide ring.

4. The structure of claim 3 wherein the second waveguide core is spaced from the second waveguide ring by a second perpendicular distance that is less than a minimum distance for optical signal transfer between the second waveguide ring and the second waveguide core.

5. The structure of claim 1 wherein the first waveguide core and the second waveguide core have a first thickness, the first waveguide ring and the second waveguide ring have a second thickness, and the second thickness is greater than the first thickness.

6. The structure of claim 1 wherein the first waveguide ring and the second waveguide ring of the ring resonator are serially-coupled.

7. The structure of claim 1 wherein the dielectric material is silicon nitride, and the semiconductor material is single-crystal silicon.

8. The structure of claim 1 further comprising:
    one or more dielectric layers between the ring resonator and the first waveguide core and between the ring resonator and the second waveguide core.

9. The structure of claim 1 further comprising:
    a first optical component coupled with the first waveguide core; and
    a second optical component coupled with the second waveguide core.

10. The structure of claim 9 wherein the first optical component is a photodetector.

11. The structure of claim 10 wherein the second optical component is a laser.

12. The structure of claim 1 further comprising:
    a resistive heater configured to be operated to transfer heat to the structure.

13. The structure of claim 1 wherein the first waveguide core is substantially straight and has a first longitudinal axis, the second waveguide core is substantially straight and has a second longitudinal axis, and the second longitudinal axis is aligned substantially parallel to the first longitudinal axis.

14. A method of forming a wavelength-division multiplexing filter, the method comprising:
    patterning a semiconductor layer to form a first waveguide core and a second waveguide core laterally spaced from the first waveguide core;
    depositing a first dielectric layer over the first waveguide core and the second waveguide core; and
    patterning the first dielectric layer to form a ring resonator that is laterally between the first waveguide core and the second waveguide core,
    wherein the ring resonator includes a first waveguide ring and a second waveguide ring arranged adjacent to the first waveguide ring, the first waveguide ring has a first non-overlapping relationship with the first waveguide core, the second waveguide ring has a second non-overlapping relationship with the second waveguide core, the first waveguide core and the second waveguide core comprise a semiconductor material, and the first waveguide ring and the second waveguide ring of the ring resonator comprise a dielectric material.

15. The structure of claim 1 wherein the ring resonator only includes the first waveguide ring and the second waveguide ring.

16. The structure of claim 1 wherein the first waveguide ring has a first width and a first thickness selected to match the effective refractive index of the first waveguide ring to the effective refractive index of the first waveguide core, and the second waveguide ring has a second width and a second thickness selected to match the effective refractive index of the second waveguide ring to the effective refractive index of the second waveguide core.

17. The method of claim 14 wherein the first waveguide core is coupled with a photodetector.

18. The method of claim 17 wherein the second waveguide core is coupled with a laser.

19. The method of claim 14 further comprising:
    forming one or more second dielectric layers between the ring resonator and the first waveguide core and between the ring resonator and the second waveguide core,
    wherein the first dielectric layer is deposited on the one or more second dielectric layers.

20. The method of claim 14 wherein the dielectric material is silicon nitride, and the semiconductor material is single-crystal silicon.

* * * * *